United States Patent [19]

Hagiwara

[11] Patent Number: 4,805,907

[45] Date of Patent: Feb. 21, 1989

[54] SLOT MACHINE

[75] Inventor: Takashi Hagiwara, Zama, Japan

[73] Assignee: Sigma Enterprises, Incorporated, Tokyo, Japan

[21] Appl. No.: 930,283

[22] PCT Filed: Mar. 8, 1986

[86] PCT No.: PCT/JP85/00117

§ 371 Date: Oct. 29, 1986

§ 102(e) Date: Oct. 29, 1986

[87] PCT Pub. No.: WO86/05113

PCT Pub. Date: Sep. 12, 1986

[51] Int. Cl.[4] .......................... A63F 9/22; G06F 15/28

[52] U.S. Cl. ........................ 273/138 A; 273/DIG. 28; 364/412

[58] Field of Search ........ 273/138 A, 85 G, DIG. 28, 273/1 E, 1 ES; 364/412; 340/323 R

[56] References Cited

U.S. PATENT DOCUMENTS

| | | | |
|---|---|---|---|
| 4,335,809 | 6/1982 | Wain | 273/138 A X |
| 4,467,424 | 8/1984 | Hedges et al. | 364/412 |
| 4,527,798 | 7/1985 | Siekierski et al. | 273/86 R |
| 4,614,342 | 9/1986 | Takashima | 273/138 A X |
| 4,636,951 | 1/1987 | Harlick | 364/412 |

FOREIGN PATENT DOCUMENTS

| | | | |
|---|---|---|---|
| 57-123191 | 7/1982 | Japan | 343/138 A |

*Primary Examiner*—Thomas H. Tarcza
*Assistant Examiner*—Gilberto Barrón, Jr.
*Attorney, Agent, or Firm*—Stevens, Davis, Miller & Mosher

[57] ABSTRACT

This invention relates to a slot machine which comprises one main machine, and a plurality of subordinate machines connected to the main machine. Each subordinate machine comprises a slot, detecting means for sensing the coins betted in; and coin paying-out means. The main machine comprises control means for starting the game in response to an output of the detection means of the subordinate machine and controlling the proceeding of the game; display means for showing on its screen symbol rows having plural kinds of symbols and movable while the game is going on; and payment commanding means for commanding the coin paying-out means to pay out coins in accordance with a preset payment rate when the result of the game is found won. The slot machine of this type brings forth communication among players thereby to make the game more amusing. This brings about more profit to the installer of the slot machine.

6 Claims, 2 Drawing Sheets

SLOT MACHINE

TECHNICAL FIELD

This invention relates to a slot machine, particularly to a slot machine in which a plurality of symbols are displayed on a CRT screen or the like.

BACKGROUND ART

The conventional slot machines are roughly classified in the mechanically operated type in which reels each with a plurality of symbols drawn on the surface of the reels are mechanically rotated to move and stop the symbol rows, and the video type in which the symbols displayed on a CRT screen are electronically controlled to move. The video-type slot machine has various types. One of the types has three reels, and another has four reels. Yet another has reels arranged in a matrix as shown in Japanese Patent Application No. 57-181170.

In the conventional slot machine described above, one slot machine is played by one player alone. While playing, the player of one machine does not communicate with the players of other machines. The players of the slot machines tend to play individual machines isolated from one another.

This invention has been made in view of this shortcoming of the conventional slot machine. The object of this invention is to provide a slot machine which enables the players of individual machines to have feeling of togetherness thereby to enjoy games more.

Another object of this invention is to provide a slot machine which attracts more players by making games more amusing consequently to yield more profit to the installers of the slot machine.

DISCLOSURE OF THE INVENTION

The slot machine according to this invention comprises one main machine, and a plurality of subordinate machines connected to the main machine. Each of the subordinate machines at least comprises a slot, detecting means for sensing the coins inserted in the slot, and paying-out means for paying out coins.

The main machine comprises control means for starting a game in response to an output of the detecting means of a subordinate machine and controlling the proceeding of the game, display means for showing on a screen symbol rows having plural kinds of symbols, which are moved while the game is going on, and payment commanding means for commanding the paying-out means of the subordinate machine to pay out coins in accordance with a preset payment rate when the result of the game is a "win" for a player.

BRIEF DESCRIPTION OF THE INVENTION

BEST MODES FOR CARRYING OUT THE INVENTION

Figure 1:
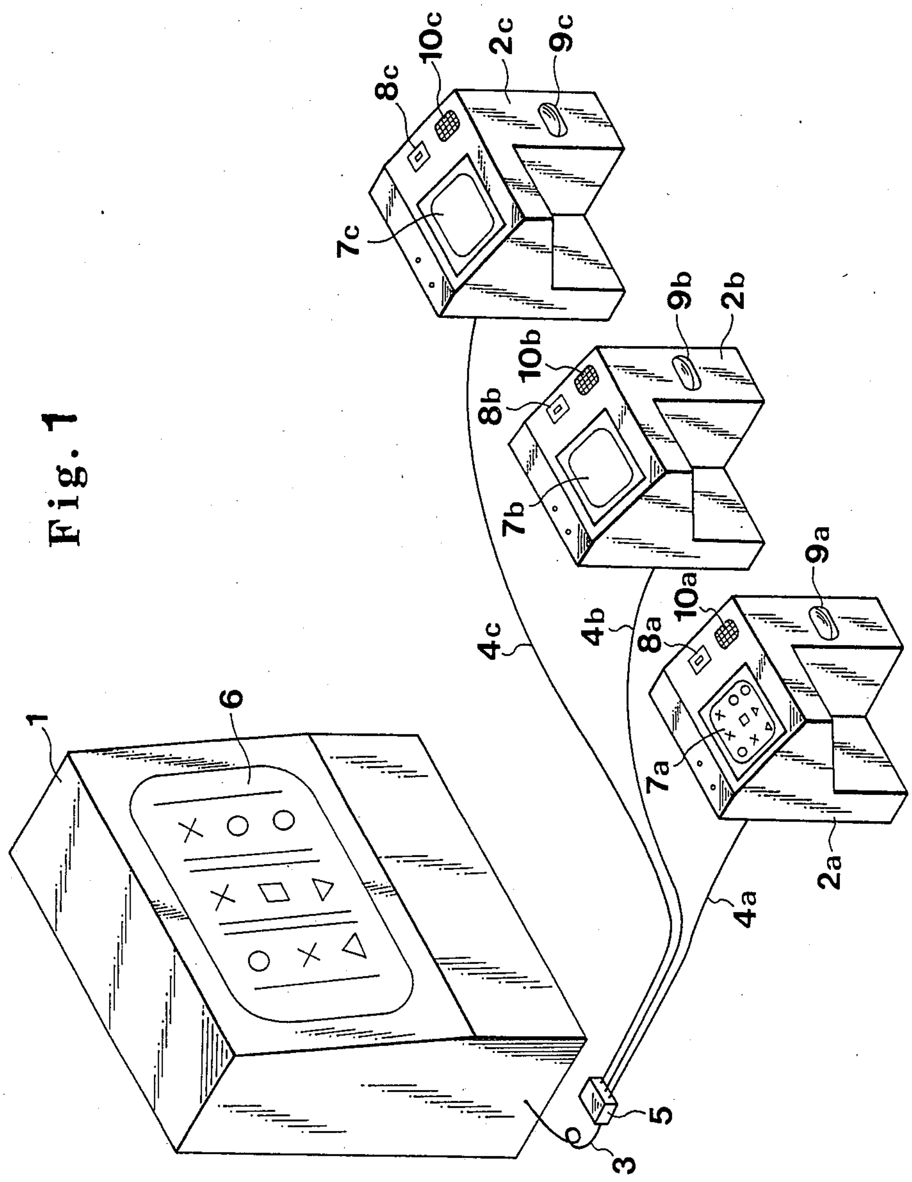
FIG. 1 is a perspective view of an embodiment according to this invention.

The slot machine according to the embodiment shown in FIG. 1 comprises one main machine 1, and three subordinate machines *2a–2c*. The main machine 1 is connected to the subordinate machines *2a–2c* by cables 3, *4a–4c* made of optical fibers, wires or the like through a distributor 5. The main machine 1 has a CRT display device 6, for example, on the front side thereof, which displays symbol rows having plural kinds of pictures and patterns for a game of the slot machine. Each subordinate machine *2a–2c* has a CRT monitor *7a–7c* which displays the same contents as the CRT display device 6 of the main machine 1. Further each subordinate machine *2a–2c* comprises a slot *8a–8c* in which a player bets coins, a coin outlet *9a–9c*, and a speaker *10a–10c* which outputs melodic sounds or the like.

Figure 2:
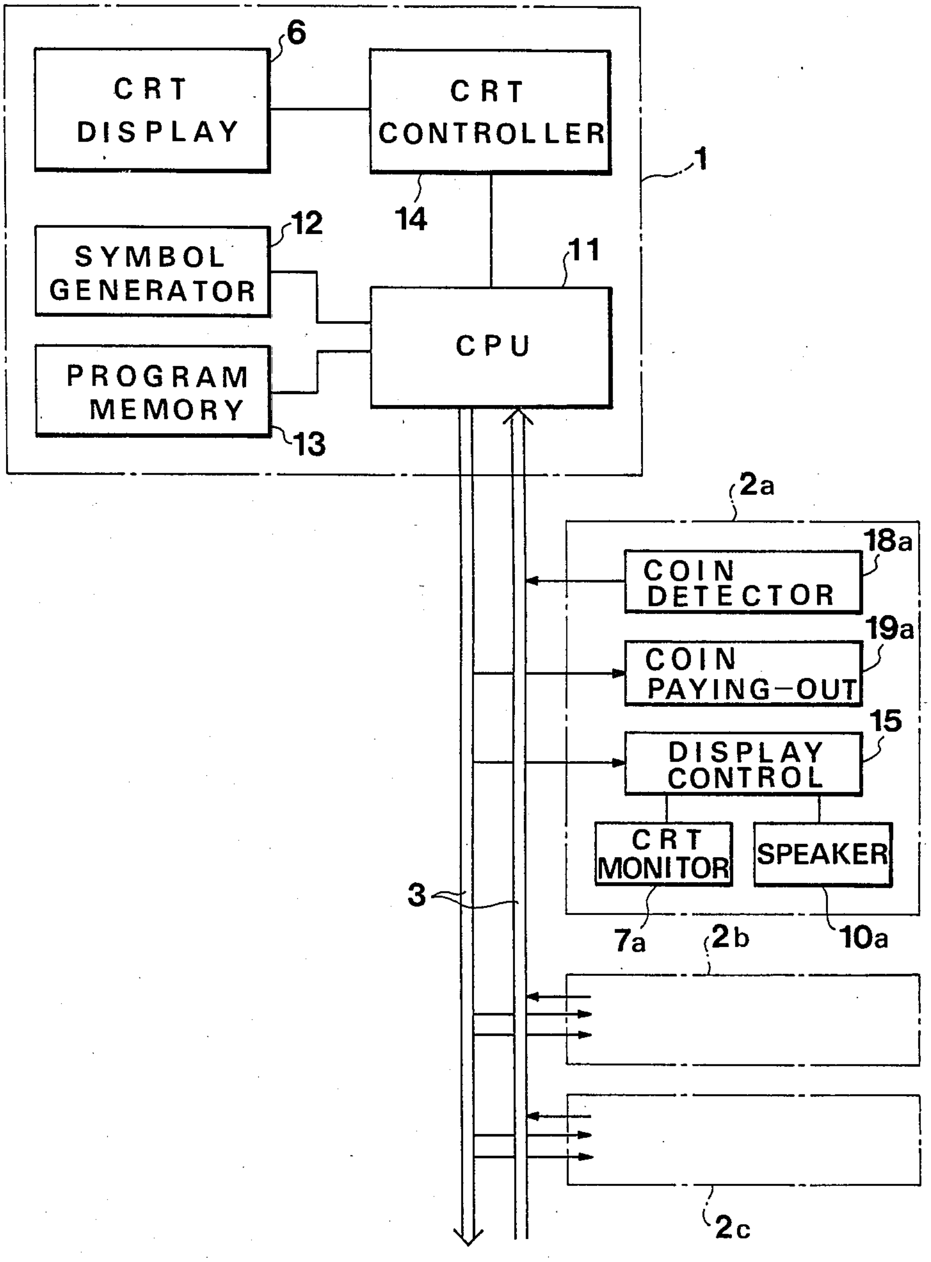
FIG. 2 is a block diagram of the embodiment of FIG. 1.

The elements shown in FIG. 1 are connected as shown in FIG. 2. The main machine 1 includes a central processing unit (CPU) 11. The CPU is connected to a symbol generator 12, for showing the pictures and patterns in the symbol rows, and a program memory 13 for storing a program for letting the game proceed. The CPU 11 is also connected to a CRT controller 14 for controlling the CRT display device 6 in accordance with a command from the CPU 11.

A subordinate machine *2a* includes a display control circuit 15 for controlling the CRT monitor *7a* and actuating the speaker *10a* in response to a command from the CPU 11, a detector *18a* for sensing betted coins inserted in the slot *8a* (FIG. 1), and a coin paying-out mechanism *19a* for paying out coins to the coin outlet *9a* (FIG. 1). The CRT monitor *7a* displays the same contents (symbol rows and others) displayed on the CRT display device of the main machine. The speaker *10a* outputs different sounds corresponding to the result, "win" or "lost" of the game. This augments the players' amusement. The detector *18a* is provided by a microswitch, or the like, for example. The detector *18a* outputs a detection signal when it detects bet coins and applies the detection signal to the CPU 11 through the cable (axis) 3. The coin paying-out mechanism *19a* pays out to the coin outlet *9a* a number of coins in accordance with a command from the CPU 11.

The above description has been made only for the subordinate machine *2a* but is the same for the subordinate machines *2b–2c*.

Next the operation of the slot machine according to this invention will be explained with reference to FIGS. 1 and 2.

First, before a player starts a game on a slot machine, the whole slot machine is turned on and a demonstration game is displayed on the CRT display device 6 and the CRT monitors *7a–7c*, and the demonstration game continues to be displayed thereon until the player bets coins in the slot *8a–8c*. The demonstration game is stored in the program memory 13. When coins are bet, the game starts on a given game starting condition. There are various game starting conditions. A typical condition depends on the number of the subordinate machines in which coins have been bet, and a period of time which has passed since the end of the previous game. To give an instance according to this typical condition, if the period of time is within 30 seconds, the game does not start when only one of the subordinate machines has coins bet, and if the period of time exceeds 50 seconds, the game starts even when only one of the subordinate machines has coins bet. Another game starting condition depends on the number of the subordinate machines in which coins have been bet, and a period of time which has passed since coins were bet. To give an instance according to this condition, 15 seconds are allowed to go from betting in a first subordinate machine until next betting, and then the game starts. The game starting condition may depend on the number of coins bet, and others. The slot machine may be provided with a game-starting lever, push button or the like that the conventional slot machine includes, and the game-starting command outputted by its operation may start a game, or combinations of this game starting command and bets may set the game starting condition.

When the game starting condition is satisfied, the CPU 11 starts the game according to the program stored in the program memory 13, selects a pay line for each subordinate machine in accordance with the number of coins betted and lets the game proceed. Meanwhile, CRT display device 6 and the CRT monitors *7a–7c* display the proceeding of the game. That is, symbol rows are displayed in motion as if a plurality of reels (e.g. 3 reels) with symbols drawn thereon were rotating about a given shaft.

A "win" is found while the game is going on. That is, it is judged whether a combination of symbols lined along the pay line when the symbols are stopped on the CRT screen agrees with a preset combination of symbols. When the former combination agrees with the latter, the CPU 11 computes a payment rate for each won combination of each subordinate machine. Then, the CPU 11 outputs a payment command to a corresponding subordinate machine. The coin paying-out mechanism of the subordinate machine which has received the payment command pays out a number of coins in accordance with the payment command. The judgement of "win" is made by the CPU 11 based on a preset table of win combinations, a random number table or others.

This invention is not limited to the embodiment described above but it includes any embodiment which comprises one main machine, and a plurality of subordinate machines connected to the main machine and each of which is occupied (played) by one player. For example, the subordinate machine included in the slot machine may be four or more, and the display means of the main machine may be a LED panel display device or the like. It is not essential that the subordinate machines have a CRT monitor and speaker, so the monitor and speaker may be optional. The pictures and patterns may be stored beforehand in a memory such as ROM or the like. The slot machine may comprise reels arranged in a matrix as described in Japanese Patent Application No. 57-181170.

The game starting condition is not limited to that described above and may be any one. For example, the main machine has a starting button, and a worker may operate it to start the game. All the subordinate machines may have their respective starting buttons, and when all the players who have bet coins push their respective starting buttons, the game may start.

INDUSTRIAL APPLICABILITY

As described hereinabove, the slot machine comprises one main machine, and a plurality of subordinate machines connected to the main machine, whereby a feeling of togetherness is created among the players with a result that games can be made more amusing. The result can attract more players consequently to bring about more profit to the installer of the slot machine.

I claim:

1. A slot machine system comprising a main machine and a plurality of subordinate machines, each of said subordinate machines including means thereat for betting coins on the outcome of a game, said main machine comprising:

control means for starting a given game in response to either a signal from at least one of said subordinate machines and a game starting command, and controlling the progress of the game in accordance with a predetermined procedure and judging a result of the game won or lost;

means for displaying the progress of the game by symbol rows made up of plural kinds of symbols while the game is in progress; and payment command means for commanding each of said subordinate machines to pay out coins, the amount of which depends on the amount of coins bet at an associated subordinate machine whent he game is judged as won by said control means, and each of said subordinate machines comprising:

a slot through which bet coins are deposited;

detecting means for sensing bet coins deposited in the slot to provide a signal to said main machine;

display means for displaying the same information as that of said display means provided in said main machine, each of said subordinate machines simultaneously playing said given game and displaying the same information; and coin pay-out means for paying out coins in response to said command from said payment command means.

2. A slot machine system according to claim 1, wherein said control means includes means for commanding the display means provided in said main machine to display a result of the game.

3. A slot machine system according to claim 2, wherein said display means provided in said main machine and in said subordinate machines comprise CRT monitors.

4. A slot machine system according to claim 1, wherein said main machine includes a game starting command means, and said control means starts the game when the game starting command means is operated.

5. A slot machine system according to claim 1, wherein said control means includes means for starting the game in accordance with a game starting condition which depends on the number of said subordinate machines at which coins are bet.

6. A slot machine system according to claim 2, wherein said control means includes means for starting the game when players bet coins on a predetermined number of said subordinate machines.

* * * * *

UNITED STATES PATENT AND TRADEMARK OFFICE

CERTIFICATE OF CORRECTION

PATENT NO. : 4,805,907

DATED : February 21, 1989

INVENTOR(S) : Takashi HAGIWARA

It is certified that error appears in the above-identified patent and that said Letters Patent is hereby corrected as shown below:

On the title page: Item [22] the "PCT Filed" information should read:

--Mar. 8, 1985--.

Signed and Sealed this

Fourteenth Day of September, 1993

*Attest:*

BRUCE LEHMAN

*Attesting Officer*

*Commissioner of Patents and Trademarks*